United States Patent
Runyon

[11] 3,917,148
[45] Nov. 4, 1975

[54] WELDING TIP
[75] Inventor: Robert C. Runyon, Del Mar, Calif.
[73] Assignee: Technical Devices, Inc., San Diego, Calif.
[22] Filed: Oct. 19, 1973
[21] Appl. No.: 408,044

[52] U.S. Cl. .................. 228/54; 228/4.5; 228/55
[51] Int. Cl.² ................................... B23K 3/02
[58] Field of Search ............ 228/1, 3, 4, 44, 54, 55

[56] References Cited
UNITED STATES PATENTS

| | | | |
|---|---|---|---|
| 3,358,897 | 12/1967 | Christensen | 228/54 X |
| 3,393,855 | 7/1968 | Moser | 228/44 |
| 3,472,443 | 10/1969 | Holyl et al. | 228/3 |
| 3,542,277 | 11/1970 | Andrews et al. | 228/55 X |

*Primary Examiner*—Francis S. Husar
*Assistant Examiner*—Gus T. Hampilos
*Attorney, Agent, or Firm*—Gausewitz, Carr & Rothenberg

[57] ABSTRACT

A weld tip for use is capillary bonding welding for electronic components includes a structural body member having a conically tapered end which forms the welding tip. A bore is provided in axial alignment with the center axis of the body member, the portion of the bore in the region of the tip forming the welding end being frusto-conical in shape, i.e., tapered with respect to the central axis, while the other end of the bonding tip includes a generally cylindrical bore. Positioned between the cylindrical bore and the tapered bore at the tip end is a second tapered bore, the latter being tapered to a greater degree than the bore at the tip end of the tool. The tip is formed by a chemical vapor deposition procedure utilizing an improved mandrel of a predetermined configuration such that preselected openings may be provided in the free end of the welding tip by cutting at preselected points along the axis of the mandrel. Thus, one mandrel may be used to provide welding tips having apertures in the working end thereof of different diameters. Typical materials which may be used as the structural material are tungsten, rhenium, molybdenum, and alloys thereof, tantalum carbide and columbium carbide, the preferred material being an alloy of tungsten and carbon wherein the carbon is present in an amount of between 0.40% and 0.50% by weight.

14 Claims, 16 Drawing Figures

A WELDING TIP

CROSS-REFERENCE TO RELATED APPLICATIONS

Reference is made to U.S. Application Ser. No. 408,043 (Docket No. 5155) filed of even date herewith and assigned to the same assignee.

BACKGROUND OF THE INVENTION

This invention relates to welding tips and a method of making the same, and more particularly to an improved welding tip for use in bonding fine wires to electronic components wherein the tip has an improved bore designed which includes a bore portion at the working end thereof which is frusto-conical in shape.

Welding tips are presently used in the manufacture of electronic components which are quite small in size, for example, integrated circuits, light emitting diodes, memory devices and semiconductor devices of a myriad of types. In the manufacture of such electronic components, a fine electrical conductor wire, ususally of gold, is used to provide electrical connections where needed. Although gold wire is predominately used, fine wires of silver aluminum or copper may also be used. The dimension of the fine wire may vary for example from 0.5 mil (0.0005 inches) to 10 mils (0.010 inches). It is for this reason that the term "capillary" is sometimes used in describing the welding tip used to make the appropriate electrical connections.

The normal procedure is to feed the wire through a bore formed in the welding tip, the bore being of a dimension varying from 0.75 mil to 15 mils or greater depending on the diameter of the wire being used.

Various procedures are presently being used, but in each case, the procedure basically involves feeding the wire through the capillary bore of the welding tip, the latter normally being heated, while the component is supported on a substrate which is likewise heated. Temperatures of approximately 300°C to 350°C are employed in heating the substrate, while the tip may be at a temperature of between 0°C and 500°C.

In one form, the gold wire is fed through the tip and bent at right angles with respect to the forward face of the tip, while the tip is heated to a temperature of between 150°C and 250°C continuously. The tip is then advanced towards the substrate and pressure is applied to force the wire into contact with the heated element on which a lead wire is to be affixed. The load applied may vary from 25 to 75 grams or more, depending on the diameter of the wire being used. While the application of this amount of static load does not seem high, the unit loading in terms of pounds per square inch is substantial because of the relatively small surface area of the face of the welding tip. Pressures varying from 15,000 to 25,000 lbs. per square inch are not common.

Once the bond has been made, the tip is retracted, allowing the wire to feed out of the end of the tip and a second bond is made, or alternatively the wire is cut. Cutting of the wire may be accomplished by subsonic shock, mechanically cutting it, or shearing the wire along the edge of the unit on which the weld is made.

Various configurations of tip faces may be used, commonly designated "nail-head", "contour", "tailless" and "wedge". The procedure above described is sometimes referred to as the multiple stitch technique, or a compression bonding technique.

Another technique sometimes followed involves forming a ball of gold on the free end of the wire by use of a hydrogen torch. The capillary tip is heated, as is the substrate, as described previously, and the ball is secured to the particular substrate by pressure applied through the tip. The capillary tip is thereafter retracted allowing the wire to feed through the bore, and the wire is severed, or optionally a second bond is made through the use of heat and pressure. The procedure just described is sometimes referred to as the ball and stitch technique, or the ball bond technique.

Still another technique, which is a modified form of the multiple stitch and the ball bond technique, involves intermittently heating the tip by pulsating electrical current, to bring the tip to a temperature of between 350°C and 550°C. In this latter procedure, particularly in the case of gold wire, it has been discovered that the pulsating intermittent application of heat sometimes causes the wire in the neck of the welding tip to recrystallize, even though the wire has not been heated sufficiently to melt it, the change in crystallization having an adverse effect on the strength of the wire.

As mentioned earlier, the tip is exposed to relatively high unit loads during use. Thus, the physical strength of the tip is significant in its performance. In terms of hardness and compressive yield, the material should have a hardness in excess of about 1800 on the Vickers scale and a compressive yield above 500,000 psi. In this range of hardness and compressive yield, the part may be machined externally, but it is quite difficult to form a bore of controlled configuration.

DESCRIPTION OF THE PRIOR ART

U.S. Pat. No. 3,472,443 of Oct. 14, 1969 describes a tungsten welding tip, although other refractory alloys are also described. The welding tip is formed by chemical vapor deposition on a mandrel having a cylindrical end which determines the diameter of the opening in the welding tip. Thus, for each different size of opening, a different size mandrel must be used. Moreover, since the shape of the mandrel determines the shape of the bore within the tip, the resultant tip of the above-identified patent includes a generally cylindrical bore in the forward end thereof.

While the tip described in the above-identified U. S. patent operates satisfactorily, several problems are known to exist, for example, oxidation of the tip especially when used in the pulse technique in which the tip is heated to temperatures of 350°C to 550°C. Also, the cylindrical wall of the forward portion of the bore through which the wire is fed radiates heat to the wire to some extent, and tends to promote recrystallization of the gold wire where a pulsing heating technique is utilized.

U.S. Pat. No. 3,358,897 of Dec. 19, 1967 describes a capillary welding tip in which the tip is composed of sintered tungsten carbide. The tip includes a drilled bore of capillary dimensions, with that portion of the bore at the exit end of the tip being generally cylindrical in shape.

While capillary tips of the type above described have been used extensively, several practical problems have arisen in connection with such tips. For example, the small capillary opening in the tip sometimes becomes plugged for any one, or a combination, of several reasons. In part, plugging may be attributable to the deposition of gold or other material on the interior bore of the capillary caused by gold wire rubbing on unpolished and rough surfaces inside bores.

Where the occlusion or plugging is the result of the deposition of metal on the bore of the capillary, for example gold, it is somewhat difficult to unplug the bore by mechanical means. One procedure which has been used is to immerse the tip in aqua regia, a mixture of concentrated hydrochloric acid and concentrated nitric acid in a volume ratio of 3 to 1. As will be appreciated, aqua regia is a very strong oxidizing agent, and frequently used to dissolve noble metals such as gold and platinum. Such a strong oxidizing agent may dissolve a portion of the tip which is in contact therewith, and depending on the composition of the tip, may adversely affect the mechanical strength thereof.

Where plugging or obstruction of the bore is attributable to dirt and other material accumulated in the bore, it is somewhat difficult to clean the bore because of the generally cylindrical bore section which is adjacent to the exit end of the tip. Where the obstruction arises because of the presence of oxidation products on the bore, it is quite difficult to remove these products from the capillary tips of the prior art.

Regardless of the reason for the plugging of the tip, it must either be cleaned or replaced. Since the tips are heated to 150°C to 500°C this is a time-consuming and relatively difficult operation. Accordingly, there are advantages to a tip which reduces the tendency to plug, or if plugged is easily unplugged.

BRIEF DESCRIPTION OF THE PRESENT INVENTION

By the present invention, an improved capillary tip is provided which overcomes some of the disadvantages of the prior art tips and which may be fabricated by an improved method.

In accordance with the present invention, the capillary bonding tip includes a bore which is in alignment with the axis of the body member of the tip. The bore includes a portion which tapers at a predetermined angle and which is adjacent to the end face. The portion of the bore remote from the end face is cylindrical. Between the cylindrical portion and the tapered portion adjacent the end face is a second tapered portion whose walls taper at a degree greater than said predetermined angle.

The body member is formed of a material such as tungsten, rhenium, molybdenum, and alloys thereof, tantalum carbide and columbium carbide. A preferred material is an alloy of tungsten in which the carbon is present in an amount of between 0.40% and 0.50% by weight.

The improved capillary bonding tip of the present invention is preferably formed by chemical vapor deposition of the structural material on a mandrel. Thus, one aspect of the present invention involves an improved method of forming aa capillary bonding tip in which the bore in the end face portion of the capillary bonding tip is preferably tapered, that is, generally frusto-conical in shape, in contrast to the prior art tips in which the bore in the end face portion is cylindrical in cross-section. The formation of this type of bore in a welding tip of the present invention is accomplished by an improved procedure utilizing a mandrel having a tapered tip portion wherein the configuration of the tapered tip is predetermined such that preselected points measured from the free end thereof represent different preselected diameters, i.e. dimension of the opening in the end face which forms the welding face of the tip.

Subsequent to deposition of material on said mandrel, the free end of the mandrel is severed at a preselected distance to provide an exposed end face of a capillary bonding tip wherein the aperture therein is of a preselected diameter. Thereafter, the mandrel is separated from the deposited material to provide a capillary bonding tip having an aperture in the end face thereof which is of a predetermined diameter corresponding to the preselected diameter of the mandrel. Thus, one mandrel may be used to provide tips having openings at the end face which vary depending on the point on the mandrel at which the tip is severed. By use of such a mandrel, a bore is provided which is tapered, rather than cylindrical thus simplifying the procedure of unplugging of the bore of the capillary welding tip.

Still another advantage of the tip of the present invention is the use of metallic alloys and refractory alloys which also are resistant to attack by aqua regia, at least to the extent of permitting tips to be treated with aqua regia in an attempt to dissolve any noble metal which may have deposited on the bore and which might form an obstruction to the free passage of the capillary wire being fed through the bore.

DETAILED DESCRIPTION OF THE PRESENT INVENTION

Figure 1:
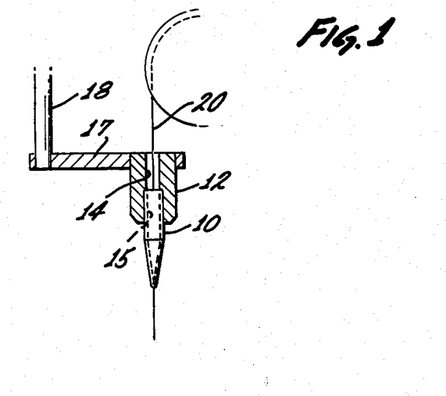
FIG. 1 is a schematic view, partly in section and partly in elevation, showing a general assembly of a welding tip and associated structure.

Referring to the drawings which illustrate preferred forms of the present invention, FIG. 1 schematically shows the relative location of a welding tip 10 mounted for reciprocating movement towards and away from a component to be welded. The tip 10 is positioned in a support member 12 which may be heated in order to heat the tip 10. The support member 12 is provided with a passageway 14 which communicates with the bore 15 of the tip 10. The support member 12 is in turn affixed to an arm 17 mounted on a rod 18, the latter being reciprocated by conventional structure of the welding apparatus.

As shown, a fine wire 20 is fed through the passage 14 of the support into the bore 15 of the tip 10. The welding apparatus normally includes a spool device for feeding the wire 20, as needed.

Figure 2:
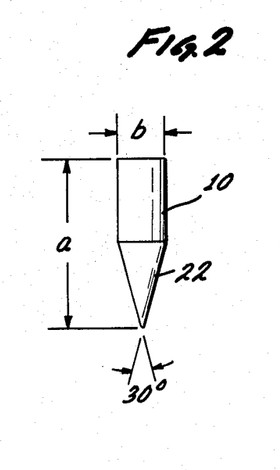
FIG. 2 is a perspective view of a straight shank capillary welding tip in accordance with the present invention.

Referring to FIG. 2, the welding tip 10 there illustrated is of the straight shank type. For purposes of illustration, typical dimensions of a straight shank welding tip are as follows, overall length-dimension $a$ is between 0.170 and 0.375 inches. The diameter, dimension $b$, is approximately 0.0625 and 0.070 ± 0.0002 inches. The forward portion 22 of the straight shank tip 10 is generally frusto-conical in shape, as indicated, the conical walls being at an angle of 25° and 30°, or 12½° and 15° with respect to the center axis of the tip.

Figure 3:
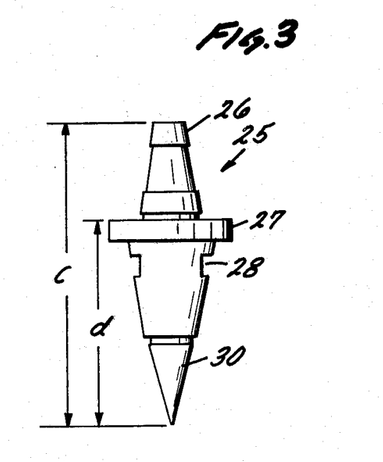
FIG. 3 is a perspective view of a capillary welding tip assembly including a capillary tip in accordance with the present invention.

FIG. 3 illustrates a somewhat different external configuration of a welding tip assembly 25. In this form, the welding tip assembly 25 includes an upper tapered portion 26 which is received within an appropriately configured support member. To provide for proper vertical alignment within a support member, the tip assembly 25 includes a flange 27, and vertically below the flange 27 are a pair of tool slots 28 as illustrated. The tip assembly 25 terminates in a tip element 30 which may be separated and received within the tip assembly, or the tip assembly 25 may be formed of one integral structure.

Typical dimensions of a tip assembly of the type illustrated in FIG. 3 are as follows: overall length dimension $c$ 0.615 ± 0.005 inches, dimension $d$, from the top of the flange to the tip approximately 0.420 inches, diameter of the flange approximately 0.250 ± 0.005 inches. The angle of the tip element 30 is as described in connection with FIG. 2.

Figure 4:
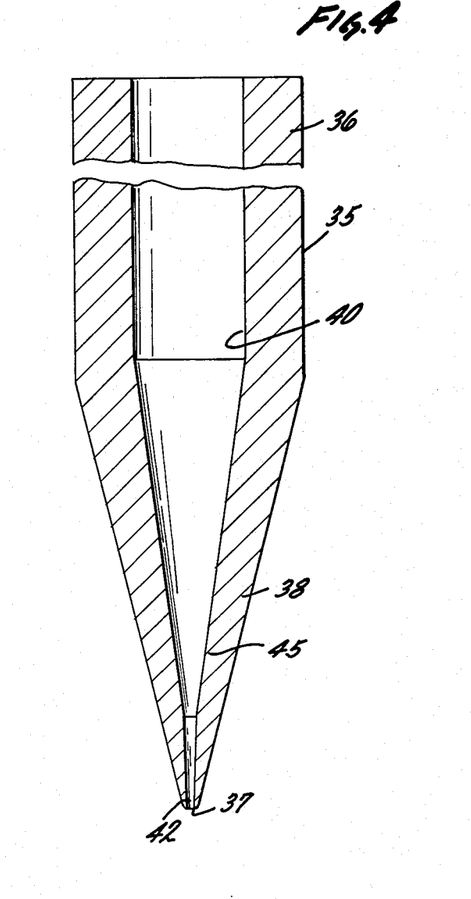
FIG. 4 is a view in section, on an enlarged scale, of a capillary tip in accordance with the present invention.

Referring to FIG. 4 which illustrates the preferred form of the invention, the capillary welding tip 35 includes a generally cylindrical body member 36 which terminates in an end face 37, the portion 38 of the body member between the cylindrical portion 36 and the end face 37 being generally frusto-conical in shape, as illustrated. The diameter of the end face 37 may be as small as 1.5 mils, and as large as 25 mils, or more.

The body includes a bore 40 which is in axial alignment with the center axis of the body member, the bore terminating in an aperture 42 in the end face. The diameter of the aperture 42 may vary from 0.7 mil to 15 mils or greater, depending upon the diameter of the wire which is fed through the bore. By way of example, and not to be construed as a limitation on the present invention, for wire of 0.7 mils, the aperture may be 1 mil while the diameter of the face may be 3 mils. Those instances in which the wire is of 5 mils in diameter, the face may be 21 mils while the aperture may be 7 mils. In any event, the diameter of the opening 42 should be slightly larger than the diameter of the wire being fed through the tip.

In accordance with the present invention, and as illustrated in FIG. 4, the bore 40 includes a portion 42 of which is generally cylindrical in cross-section, and a portion 45 which is frusto-conical in shape.

The body member 36 is formed of a structural material which imparts the principal structural integrity to the tip. The structural material is preferably of a high strength composition such as tungsten, rhenium, molybdenum, and alloys thereof, tantalum carbide, columbium carbide, with the preferred material being a carbon alloy of tungsten in which the carbon is present in an amount by weight between 0.40% and 0.50%. These materials, especially the carbon alloy of tungsten exhibit resistance to attack by aqua regia and thus allow cleaning of plugged tips without substantial chemical attack by the acid. For example, the carbon alloy of tungsten described is capable of being immersed in aqua regia for as long as 4 hours at 80°C without etching.

Figure 5:
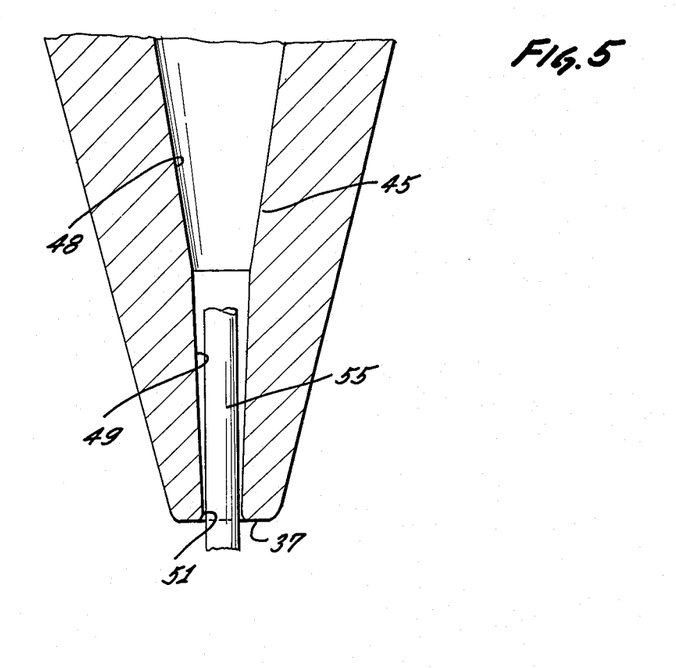
FIG. 5 is an enlarged fragmentary view showing the details of the lower portion of the capillary tip in accordance with the present invention.

The improved performance of the capillary tip of the present invention may be understood with reference to FIG. 5 which shows, on a much enlarged scale, the lower portion of the capillary tip in accordance with a preferred form of the invention. For purposes of orientation, the frusto-conical portion 45 of the bore is shown, and in the preferred form, the frusto-conical portion of the bore includes two generally tapered bores indicated as 48 and 49. Frusto-conical bore section 49 is immediately adjacent the end face 37, and as indicated, is tapered somewhat. Tapered bore portion 48 is located between the cylindrical portion of the bore (FIG. 4) and tapered bore portion 49. Tapered bore portion 48 is tapered to a greater degree than the portion 49 of the bore immediately adjacent to the end face 37. By way of example, the included angle of bore portion 49 is approximately 5°, i.e. 2.5° on a side while the included angle of bore portion 48 is approximately 16°, i.e. 8° on a side.

As indicated in FIG. 5, the outer periphery of the end face 37 is rounded, while the inner peripheral surface of the aperture 42, is likewise rounded. The face 37, however, is flat and operates as the working face of the tip.

The diameter of the opening 42, measured at the intersection 51 of the rounded portion of the aperture and the adjacent wall, is effectively the diameter of the opening 42. Assuming a wire diameter of approximately 0.7 mils, the opening 42, measured at 51, is approximately 1 mil in diameter, thus providing at the opening 42 a relatively small clearance between the outer surface of the wire 55 and the inner surface of the wire 55 and the bore gradually increases, the smallest clearance being at the open end. Also, it will be apparent that the diameter of the opening increases from a minimum at 51 to a maximum at the cylindrical section of the bore.

The advantages of such a structure are several, including a small working clearance which is a very small fraction of a mil. In the event that there is plugging, it will generally occur at the smallest point in the opening, or the narrow band defined in a plane designated by the reference numeral 51. Thus, in contrast to some of the prior art devices, unplugging by use of a mechanical device is somewhat simplified by virtue of the fact that a cylindrical probe is inserted within a tapered bore. Additionally, the increase clearance vertically above the open end also assists in reducing transfer of heat from the tip to the wire, a definite advantage where a pulsing technique is used.

Figure 6A:
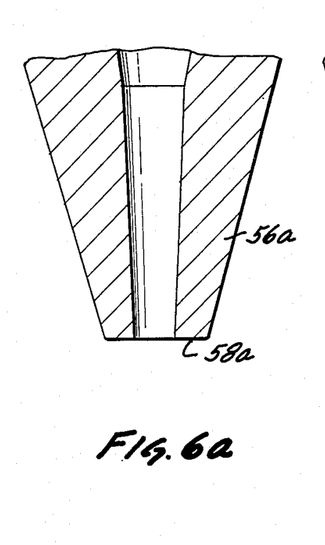
FIGS. 6a to 6c are fragmentary sectional views illustrating various configurations of the capillary welding tip tool in accordance with the present invention.
Figure 6B:
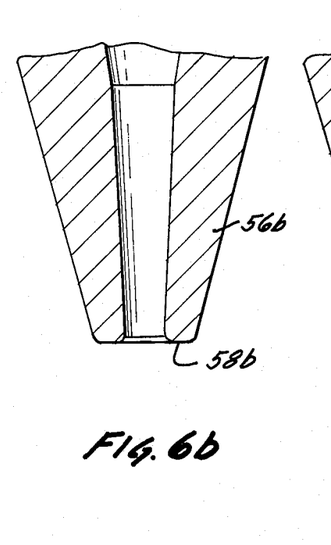
Figure 6C:
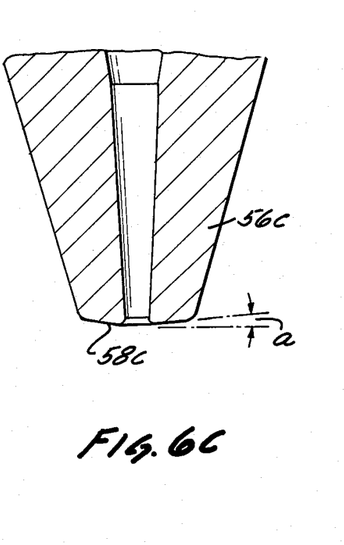

The working face of the capillary tip may take various forms, for example any one of the forms illustrated in FIGS. 6i a–6c, which are fragmentary views of the lower portion of a capillary tip in accordance with the present invention.

Referring to FIG. 6a, a tip 56a is indicated of the nailhead configuration which is characterized by having a flat front face 58a with corners which are fairly sharp, as shown.

FIG. 6b illustrates a tip 56b of the contour configuration in which the forward face 58b is flat, but the corners rounded considerably to provide a smooth rounded contour at the junction between the outer surface of the tip, the front face and the inner bore portion of the tip.

The configuration illustrated in FIG. 6c is the tail-less configuration of tip 56c and is characterized by a front face 58c which is recessed to between 8° and 16° from the horizontal, that is, the angle a is between 8° and 16°. In this form, the junction between the front face 58c and the outer side wall is vertically above the junction between the bore and the front face, as illustrated.

Figure 7:
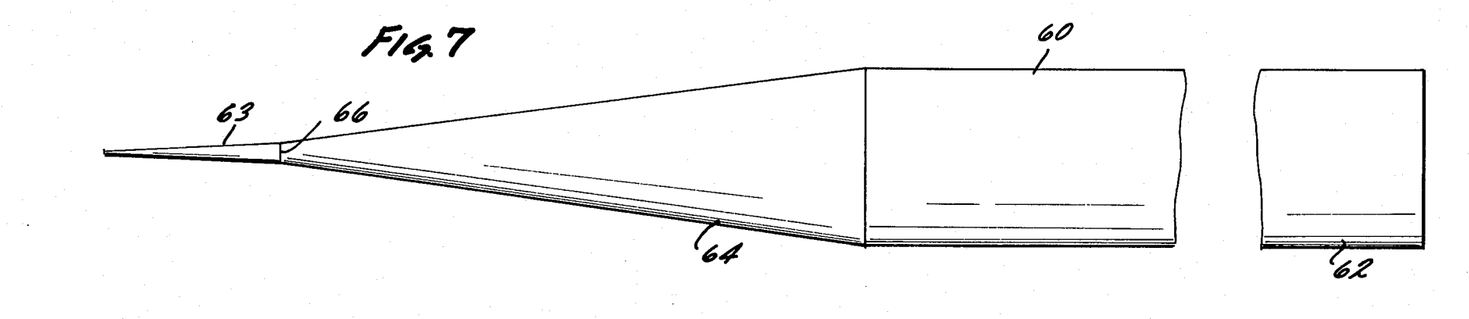
FIG. 7 is a view of a mandrel in accordance with this invention used to form the novel capillary tips of the present invention.
Figure 8:
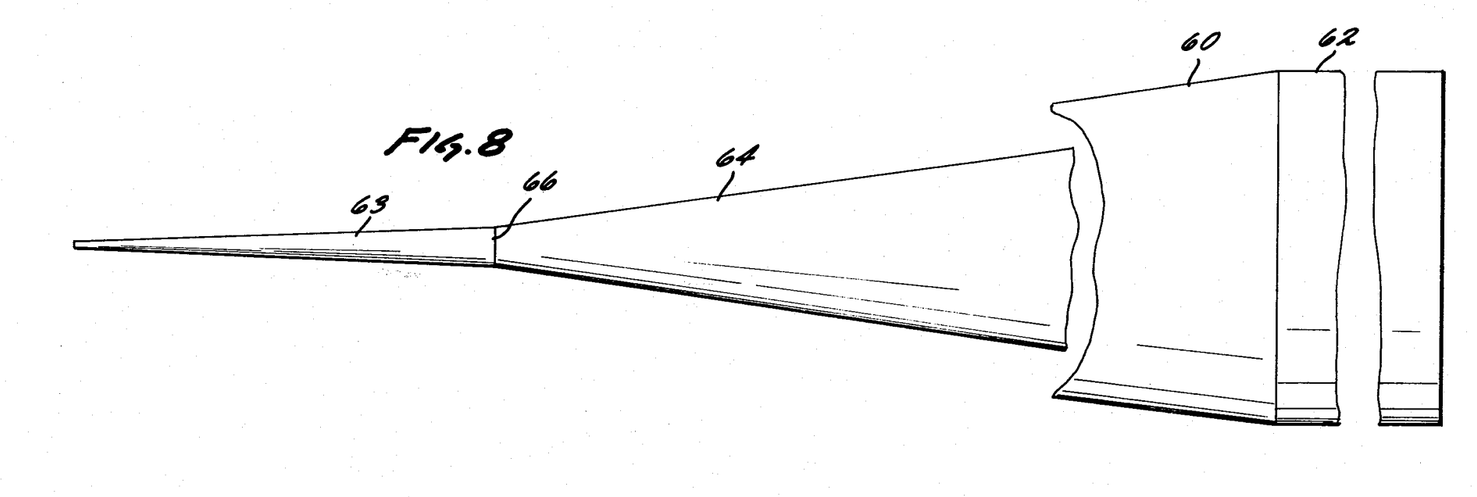
FIG. 8 is an enlarged fragmentary view of the tip end of the mandrel illustrated in FIG. 7.

One aspect of the present invention is the provision of an improved method of constructing capillary welding tips of the type described. Referring to FIGS. 7 and 8, a mandrel 60 is shown including a cylindrical section 62 which forms the corresponding cylindrical portion of the bore, already described. Spaced from the cylindrical section 62 of the mandrel is a tapered nose 63, the nose forming bore portion 49 illustrated in FIG. 5. Between the tapered nose 63 and the cylindrical section is a second tapered section 64 which forms the tapered portion 48 of the capillary tip illustrated in FIG. 5. Each of the tapered portions 63 and 64 is generally frusto-conical in shape, the taper of portion 64 being much greater than that of portion 63. By way of example, the mandrel is approximately 1.625 inches long, with the tapered portion 64 being tapered approximately 8° on the side or a total included angle of 16°, while tapered portion 63 is tapered 2½° on a side or a 5° included angle. The junction 66 between tapered portions 63 and 64 is a smooth transistion between the two tapered surfaces. The outer surface of the mandrel is finished to a surface finish of approximately 1 microinch. This may be achieved by electro-polishing or any of the other well known techniques for providing this high surface finish.

The mandrel 60 is of a predetermined configuration such that preselected points along the length of the tapered portion, as measured from the free end thereof, represent different preselected diameters of openings in the capillary tip. Referring to FIGS. 9a through 9e inclusive, each mandrel may be 1.625 inches in length, for example. The free end 70a of the mandrel 60a shown in FIG. 9a may have a diameter, for example, of approximately 0.5 mils. The length of the tapered portion 63a, that is the axial dimension between the tip 70a and transition point 66a is approximately 15 mils, tapered portion 63a being at a 5° taper, as an included angle, or 2½° on a side as measured along the axis of the mandrel 60a. By this geometric arrangement, each increment of 1 mil from the free end 70a of the mandrel produces a change of 0.087 mils in diameter.

Figures 9A, 9B:
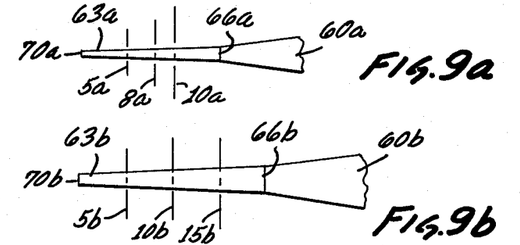
FIGS. 9a to 9e are diagrammatic views of the improved mandrel in accordance with the present invention illustrating the relationship between the preselected point along the mandrel and the diameter of the opening in the capillary tip.

Accordingly, if one were to sever the mandrel 5 mils from the free end 70a, the diameter of the mandrel at 5a would be approximately 1 mil. If the mandrel is severed along line 8a of FIG. 9a, the diameter of the free end of the mandrel would then be 1.3 mils. If severed along line 10a, the diameter of the mandrel would be approximately 1.5 mils. Thus, one mandrel, of the configuration illustrated in FIG. 9a is capable of providing tips having openings of various dimensions depending upon the preselected point along the mandrel at which the cut is made. This is in sharp contrast with the prior art procedure in which the mandrel was provided with a cylindrical end wall such that a different diameter cylinder was used for each different diameter of opening in the capillary tip.

By this invention, severing the mandrel at the appropriate preselected point axially from the free end provides a precise preselected diameter which is coordinated and correlated to the predetermined configuration of the mandrel, as described.

Referring to FIG. 9b, a mandrel is there illustrated having a free end 70b of a diameter of approximately 1.5 mils. If severed along line 5b, an aperture of 2 mils is provided, while severance along lines 10b and 15b provides diameters of 2.5 and 3 mils, respectively.

Figure 9C:
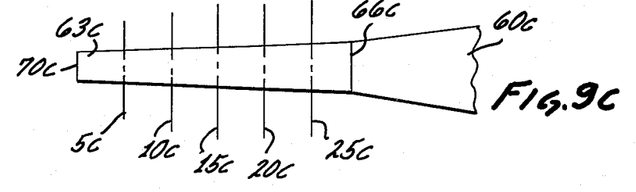
Figure 9D:
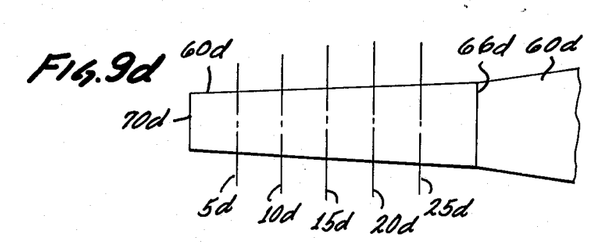
Figure 9E:
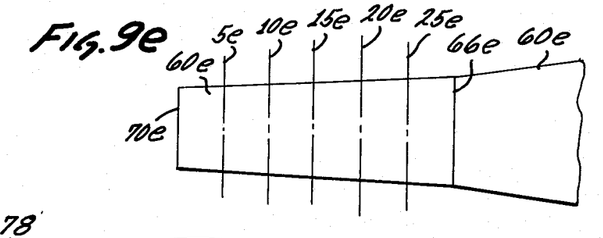

In the form of mandrel illustrated in FIG. 9c, the end face 70c has a diameter of 3.5 mils, and severance along the lines 5c, 10c, 15c, 20c and 25c provides diameters of 4, 4.5, 5, 5.5, and 6 mils, respectively. Essentially the same technique applies with respect to the mandrels illustrated in FIGS. 9d and 9e in which the end face of the mandrel has a diameter of 6.5 mils and 9.5 mils, respectively. Severance along the line 5d, 10d, 15d, 20d, and 25d provides apertures of 7 mils, 7.5 mils, 8 mils, 8.5 mils, and 9 mils, respectively, while severance of the mandrel 60e along the lines 5e, 10e, 15e, 20e, 25e provides apertures of a dimension of 10 mils in diameter, 10.5, 11, 11.5, and 12 mils in diameter, respectively. The above dimensions are given as illustrative, it being understood by those skilled in the art that other dimensions may be utilized in order to provide a mandrel usable to form apertures in capillary tips, wherein the aperture diameter is correlated to that point along the axis of the mandrel at which the mandrel is severed.

In accordance with the present invention, a preferred procedure for depositing the structural material is by a chemical vapor deposition procedure. The advantages of a chemical vapor deposition method of forming the structural component involves the variety of materials which may be deposited by this procedure as well as the formation of deposits of maximum density which closely reproduce the fine detail of the substrate upon which they are deposited. For this reason, the mandrels used in the present invention are finished to a surface finish of 1 micro-inch. Generally, the procedure involves a volatile compound which is vaporized, the vapor thermally decomposed, or reacted with other vapors, the reaction taking place at the substrate to provide non-volatile reaction products which deposit on the substrate. Coating thickness may be varied by control of the temperature or time of processing, or both.

After preparation of the mandrels, including selection of the proper size mandrel for the particular capillary tip being formed, the mandrels are mounted in an appropriate reaction chamber. The usual procedure for mounting is to support the mandrels by the cylindrical end section, since the mandrel is approximately 1.625 inches long while the finished dimension of the capillary tip, in the case of a straight shank tip is in the range of 0.170 to 0.375 inches. The composition of the mandrel may vary depending upon the materials to be deposited on the mandrel. Generally, molybdenum or 302 type of stainless steel which has been hard drawn is satisfactory for use where the chemical vapor deposition procedure is carried out at the temperature of below about a 1,000°. At about 900°C, a mandrel made of this particular grade of stainless steel or molybdenum tends to expand somewhat thus simplifying removal of the mandrel from the finished product as will be described hereinafter. Where the processing involves temperatures in excess of about 1,000°C, the mandrel may be made of molybdenum.

The procedure involves the use of a reaction chamber usually in the form of a quartz tube. The mandrels are mounted in the reaction chamber and heated to provide a heated substrate for the reaction. The preferred alloy of tungsten and the relatively small amount of carbon is formed by the use of tungsten hexachloride or tungsten hexafluoride, hydrogen gas and carbon monoxide, $CO_2$, all suitably proportioned in the proper ratio to form a deposit on the heated substrate i.e. the mandrel or multiplicity of mandrels mounted in the chamber.

In the case of a tungsten alloy of carbon wherein the latter is present in an amount by weight of between 0.4 and 0.5%, the resulting alloy is of considerable strength. For example, the hardness on the Vickers scale is 1,800 to 2,000 or more depending upon the precise amount of carbon and deposition temperature. The transverse rapture (bend) strength is 500,000 psi while compressive yield is approximately 2,000,000 psi. These physical characteristics are quite desirable in view of the nature of the capillary tip, the axial loads applied during use and the abrasive nature of the compressive bonding operation, especially along the working face of the capillary tip.

Figure 10:
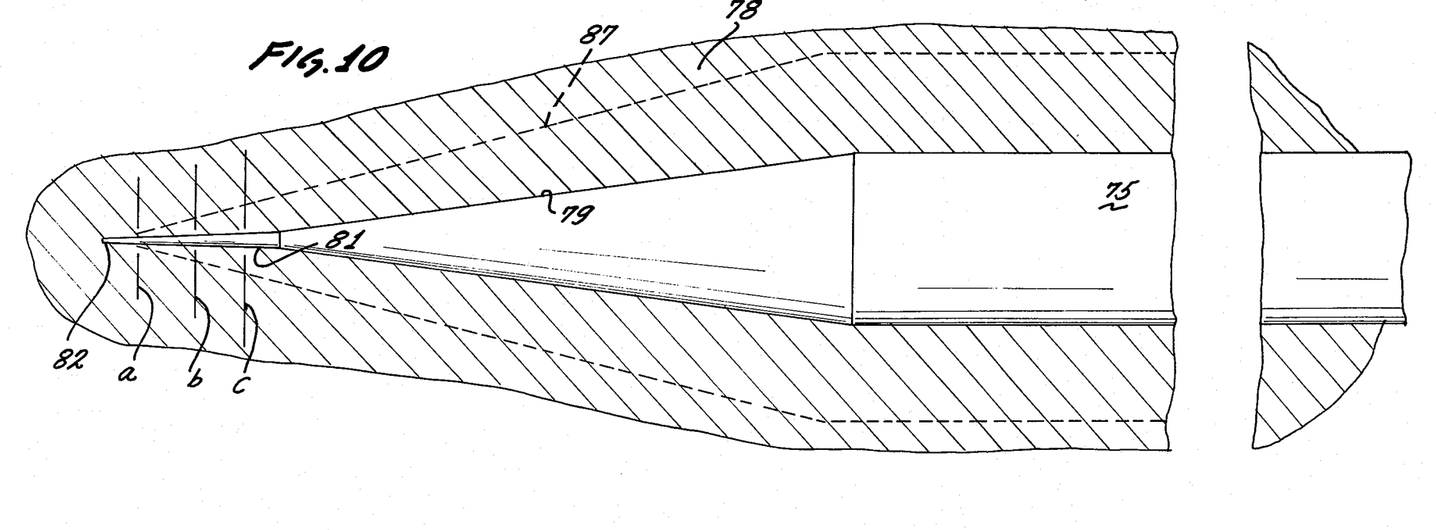
FIG. 10 is a view similar to FIG. 7 showing the relative position of material deposited on the mandrel in accordance with the present invention.

Referring to FIG. 10, a mandrel 75 of the type previously described is shown having a chemical vapor deposited coating 78 thereon. Coating 78 is deposited directly on the mandrel anad is one of the materials previously described. Coating 78 covers a substantial portion of the cylindrical surface of the mandrel, as illustrated, the first conical surface indicated 79, the second conical surface 81 and the tip end of the mandrel generally indicated 82. The general contour of the mandrel and the associated coating after the deposition procedure is that as illustrated schematically in FIG. 10.

The next operation in the procedure for preparing capillary tips in accordance with the present invention is to remove the excess structural material to provide a tip blank of a contour indicated by the dotted lines 87 in FIG. 10. The excess material may be removed by a diamond grinding operation. As a general rule, the cross-sectional thickness dimension of the structural material is approximately 2 to 7 times the diameter of the opening to be formed in the end face of the capillary tip. The preferred procedure is to machine the outside diameter to the desired dimension and thereafter perform the other operations, as described.

Since the dimension of the cone area 81 of the mandrel is predetermined and coordinated and correlated with respect to the desired diameter of the opening in the end face of the capillary tip, any one of several aperture dimensions is readily possible depending upon the point axially along the mandrel from the tip end at which the coating and mandrel are severed. Thus, depending on the dimension of the mandrel, as already described, severing the mandrel along the line $a$ of FIG. 10 may provide an opening of 2 mils, while severing along the line $b$ may provide an opening of 3 mils, for example.

Thus, one of the practical advantages of the procedure of the present invention is the ability to use a single mandrel to form a multiplicity of blanks, followed by a finishing operation in which the mandrel may be severed at any preselected point along its length in order to provide capillary tips of different, but predetermined and known aperture dimensions in the working face. The advantage, therefore, is that one mandrel may be used for tips having three different dimensions, for example, rather than having to form three different mandrels, as has been the practice in the prior art.

The mandrel may be removed from the tip blank by etching with an acid in view of the fact that structural coating 85 is resistant to acids. In some instances, shrinkage of the mandrel relative to the deposited coating may be sufficient to permit withdrawal of the mandrel without the necessity of an etch.

Once the mandrel is removed, the tip end configuration is finished in accordance with any of the various forms of tip ends heretofore described.

From the foregoing description, it will be apparent to those skilled in the art that significant advantages are achieved by following the procedures and utilizing the forms of capillary tips described heretofore. Additionally, the methods of preparing and fabricating such tips, as heretofore described, offer unique advantages in simplifying the complex procedure while providing versatility. For example, if in the use of a mandrel having a conical end portion some error is made in severing along the predetermined point axially along the mandrel, the error does not result in a useless part, in that the part can be salvaged by making an appropriate cut axially to provide a capillary tip of the next higher aperture dimension. Additionally, it will be apparent that mandrels which have not been used in a coating or fabricating operation may be used as a device to unplug clogged capillary tips, especially those mandrels having a tapered forward portion which, due to the geometry of the mandrel and the geometry of the bore, will always provide an end portion which is of a diameter somewhat smaller than the diameter of the capillary bonding tip being cleaned.

It will also be appreciated by those skilled in the art that the various dimensions and materials mentioned in the foregoing description are for purposes of illustration and constitute preferred forms of the present invention. It will also be apparent to those skilled in the art that various changes and modifications may be made with respect to the structure and methods herein described without departing from the scope of the invention as set forth in the appended claims.

I claim:

1. A capillary bonding tip for use as a welding tool for electronic components wherein the tip is subjected to heat during use and wherein a metallic member is advanced through the tip comprising:
    means forming a body member, said body member terminating in an end face defining the welding surface of said tip,
    said body member including surface means defining a bore in axial alignment with the center axis of said body member,
    said bore including a portion extending to the end face of said body member having walls tapered at a predetermined angle to a minimum transverse dimension at said end face, and
    said bore in the portion of said body member forming said end face being of capillary dimensions.

2. A capillary bonding tip as set forth in claim 1 wherein the dimension of the bore at said portion thereof extending to said end face gradually increases from a minimum at the open end thereof at said end face to a maximum at the end opposite said welding surface.

3. A bonding tip as set forth in claim 1 wherein said bore includes a generally cylindrical bore portion at a portion thereof remove from said end face, said bore including a second tapered portion between said cylindrical portion and said portion extending to said end face, and said second tapered portion having walls that taper at an angle greater than said predetermined angle.

4. A bonding tip as set forth in claim 1 wherein the bore in the portion of said end face is of a dimension of between 0.0007 and 0.010 inches.

5. A bonding tip as set forth in claim 1 wherein said body member is of an alloy of tungsten and carbon.

6. A bonding tip as set forth in claim 1 wherein said predetermined angle is such that for each change axially in the length of 0.001 inches in the welding tip the diameter of the bore changes approximately .000087 inches.

7. A bonding tip as set forth in claim 1 wherein said body member is composed of an acid resistant structural material.

8. A bonding tip as set forth in claim 7 wherein said structural material is selected from the group consisting of tungsten, rhenium, molybdenum, and alloys thereof, tantalum carbide and columbium carbide.

9. A bonding tip as set forth in claim 8 wherein said structural material is chemically vapor deposited.

10. A bonding tip as set forth in claim 3 wherein said predetermined angle is 5°.

11. A bonding tip as set forth in claim 3 wherein the angle of taper of said second portion is 16°.

12. A capillary bonding tip as set forth in claim 1 wherein said body member is formed of a material having a Vickers hardness of at least 1,800, a transverse rupture (bend) strength of at least about 500,000 psi and a compressive yield of at least about 2,000,000 psi.

13. A capillary bonding tip for use as a welding tool for electronic components comprising:

means forming a structural body member, means in said body member defining a bore in axial alignment with said body member, said body terminating in an end face defining the working face of said tip, the portion of said bore at the working face of said tip having an opening therein of capillary dimensions, said bore tapering in transverse dimension to said working face from a location remote therefrom, and said structural body member being a chemically vapor deposited alloy of tungsten and carbon wherein said carbon is present in an amount by weight of between 0.40% and 0.50%.

14. A capillary bonding tip as set forth in claim 13 wherein the portion of said bore adjacent to said working face is generally frusto-conical in cross-section.

* * * * *

UNITED STATES PATENT OFFICE
CERTIFICATE OF CORRECTION

PATENT NO. : 3,917,148
DATED : November 4, 1975
INVENTOR(S) : Robert C. Runyon

It is certified that error appears in the above-identified patent and that said Letters Patent are hereby corrected as shown below:

In the ABSTRACT, line 1, change "is" to --- in ---.

Column 3, line 58, change "aa" to --- a ---.

In the CLAIMS, column 11, Claim 3, line 3, change "remove" to --- remote ---.

Signed and Sealed this ninth Day of March 1976

[SEAL]

Attest:

RUTH C. MASON
Attesting Officer

C. MARSHALL DANN
Commissioner of Patents and Trademarks